United States Patent
Hund et al.

(10) Patent No.: US 7,158,293 B2
(45) Date of Patent: Jan. 2, 2007

(54) TUBE FOR A MICROSCOPE

(75) Inventors: Andreas Hund, Gleichen-Reinhausen (DE); Armin Pausch, Schoeffengrund (DE); Peter Euteneuer, Lahnau (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 0 days.

(21) Appl. No.: 10/752,954

(22) Filed: Jan. 7, 2004

(65) Prior Publication Data

US 2004/0141231 A1    Jul. 22, 2004

(30) Foreign Application Priority Data

Jan. 7, 2003    (DE) ............................... 103 00 456

(51) Int. Cl.
*G02B 21/00* (2006.01)

(52) U.S. Cl. ........................................ 359/384; 359/379
(58) Field of Classification Search ................ 359/368, 359/384
See application file for complete search history.

(56) References Cited

U.S. PATENT DOCUMENTS

| 4,938,575 | A | * | 7/1990 | Kleinberg et al. ........... 359/377 |
| 5,519,531 | A | * | 5/1996 | Sato ............................ 359/380 |
| 5,764,408 | A |   | 6/1998 | Otaki .......................... 359/368 |
| 6,188,515 | B1 | * | 2/2001 | Nihoshi ....................... 359/384 |
| 6,407,857 | B1 | * | 6/2002 | Kawasaki .................... 359/384 |
| 2001/0030801 | A1 |  | 10/2001 | Kawasaki .................... 359/384 |

FOREIGN PATENT DOCUMENTS

JP    61 294408    12/1986

* cited by examiner

*Primary Examiner*—Mark A. Robinson
(74) *Attorney, Agent, or Firm*—Darby & Darby (57) ABSTRACT

A tube for a microscope includes a tube housing, an adaptation interface, a beam guidance device, an operator interface, and a beam deflecting device. The beam deflecting device deflects a light beam coming from the adaptation interface so that the optical axis of the light beam extends in a plane and is guided by the beam guidance device to the operator interface. The tube housing, together with the beam guidance device and the operator interface, is movable relative to the microscope in a direction parallel to the plane.

27 Claims, 5 Drawing Sheets

TUBE FOR A MICROSCOPE

This application claims priority to German patent application 103 00 456.4, the subject matter of which is hereby incorporated by reference herein.

The present invention generally concerns a tube for a microscope, and particularly concerns a tube for a microscope where the tube has a tube housing, an adaptation interface, a beam deflecting unit, further beam guidance means, and an operator interface, a light beam coming from the adaptation interface being deflectable with the beam deflecting unit in such a way that its optical axis at least locally extends substantially in a predefined plane, and can be guided by the further beam guidance means to the operator interface, provision being made for the tube housing, together with the further beam guidance means and the operator interface, to be movable relative to the microscope in a direction parallel to the predefined plane.

BACKGROUND

Tubes for microscopes have been known for some time from the existing art. Reference is made, purely by way of example, to U.S. patent application Ser. No. 2001/00 30 801 A1, from which a tube for a microscope is known. This tube is a so-called ergonomic tube, namely one in which the operator interface—the portion of the tube, usually the eyepieces, facing toward an operator's eyes—is arranged rotatably. The rotatable arrangement of the operator interface makes possible an individual adaptation of the tube to an operator of the microscope in such a way that, for example, the eyepieces of the tube can be moved on a circular arc. The viewing height into the microscope tube can thereby be adjusted, a change in the horizontal eyepiece position being simultaneously accompanied, because of the rotatably arranged operator interface, by a change in the vertical eyepiece position.

Each microscope operator usually assumes a position with respect to the microscope that is acceptable to him or her. For example, the spacing of some microscope operators from the microscope is relatively small, but the spacing of other microscope operators from the microscope is relatively large in comparison thereto. This can depend, inter alia, on the microscope operator's arm length. A microscope operator can vary the viewing height using the microscope tube known from U.S. patent application no. 2001/00 30 801 A1, but the viewing angle for the operator also simultaneously changes, so that the operator must tilt his or her head differently for different rotation angle positions of the operator interface. There is thus only a very limited possibility for working ergonomically with the microscope. With the microscope tube known from U.S. patent application no. 001/00 30 801 A1, it is not possible to vary the spacing from the microscope to the operator without varying the viewing angle.

SUMMARY OF THE INVENTION

It is therefore an object of the present invention to provide a tube for a microscope in which the spacing from the operator interface to the microscope can be modified in a predefined direction while maintaining the viewing angle.

The present invention provides a tube for a microscope, including a tube housing (3), an adaptation interface (4), a beam deflecting unit (5), further beam guidance means (7), and an operator interface (8). A light beam coming from the adaptation interface (4) is deflectable with the beam deflecting unit (5) in such a way that its optical axis (6) at least locally extends substantially in a predefined plane, and can be guided by the further beam guidance means (7) to the operator interface (8). Provision is made for a relative motion of the tube housing (3), together with the further beam guidance means (7) and the operator interface (8), with respect to the microscope (2) in a direction (10) parallel to the predefined plane.

According to the present invention a modification of the spacing of the operator interface from the microscope in a predefined direction while maintaining the viewing angle can be achieved in surprisingly simple fashion by moving the entire tube housing relative to the microscope. The relative motion of the tube housing takes place in a direction parallel to the predefined plane. The predefined plane is usually oriented horizontally, so that as a result of the relative motion the spacing of the operator interface from the microscope stand can be directly modified in the horizontal direction, very generally in a predefined direction.

The light beam coming from the adaptation interface is firstly deflected by means of the beam deflecting unit in such a way that its optical axis at least locally extends substantially in the predefined plane. The further beam guidance means provided in the tube then guide to the operator interface the beam that extends in the predefined plane. Upon a relative motion of the tube housing in a direction parallel to the predefined plane, the further beam guidance means are moved in the same fashion, so that upon a relative motion of the tube housing the length of the path traveled by the light beam in the predefined plane is modified.

As already indicated above, the predefined plane is arranged substantially parallel to a tube changing surface, or parallel to an upper housing surface of the microscope, or substantially horizontally. The upper housing surface of the microscope is usually embodied horizontally, so that in this case the relative motion of the tube housing with respect to the microscope is likewise accomplished in a horizontal direction. If the upper housing surface of the microscope has an inclination relative to the horizontal plane, for example for design reasons, the relative motion of the tube housing with respect to the microscope could likewise be accomplished in the direction of the inclined housing surface of the microscope.

For physical implementation of the relative motion of the tube housing with respect to the microscope, guidance means are provided with which the motion of at least a part of the tube housing is guided. In this context, the tube housing is in some circumstances constructed so as to comprise two parts. The one part is embodied in stationary fashion relative to the adaptation interface of the microscope, whereas the other part of the tube housing executes the relative motion. The guidance means are preferably embodied in positively engaged fashion, for example a correspondingly embodied dovetail guide. The guidance means are preferably arranged on the tube housing itself, so that the tube according to the present invention can also be adapted at a later time onto already-installed microscopes. In this respect the tube according to the present invention is advantageously compatible—assuming an appropriate interface—with all microscope stands.

In an embodiment, provision is made for the relative motion of the tube housing with respect to the microscope to be accomplished in a direction that is directed away from or toward the operator. This takes into account a situation in which different microscope operators usually assume a different spacing from the microscope, but can nevertheless make an ergonomic adjustment of the operator interface.

The light beam coming from a microscope objective of the microscope usually takes the form of a so-called infinite beam. This is a substantially collimated beam shape that nevertheless diverges slightly. The slight divergence is attributable to the fact that the light proceeding from each specimen point is converted by the microscope objective into a collimated individual light beam. Since this applies to every specimen point in the specimen plane of the microscope objective, collimated individual light beams that diverge slightly in their propagation direction relative to one another, and—in particular for individual light beams extending in the field—with respect to the optical axis, are produced over the entire microscope objective pupil. Because of this beam divergence, the beam diameter becomes continually greater with increasing distance from the microscope objective, so that a compact design for the tube would not be possible if the beam shape were substantially unchanged. The term "light beam" hereinafter refers to the totality of all individual light beams extending from the microscope objective pupil.

A lens device, which preferably has a positive refractive power and converts a substantially collimated light beam coming from the microscope into a converging light beam, is therefore provided between the adaptation interface and the beam deflecting unit. As a result, the light beam extending in the tube in any event no longer exhibits divergence, so that a compact design for the tube is advantageously attainable and smaller optical components can be used, for example for the further beam guidance means. The refractive power of the lens device is accordingly embodied at least in such a way that the light beam extending in the tube just no longer diverges.

In an embodiment, provision is made for a further lens device to be provided in the region in which the light beam deflected by the beam deflecting unit extends in the predefined plane. The further lens device comprises a lens or lens group having negative refractive power, and a lens or lens group having positive refractive power. The two lenses are configured and arranged in such a way that a substantially collimated light beam extends between the lenses. Since a relative motion of the tube housing with respect to the microscope modifies the length of the path of the light beam extending in the predefined plane, provision of the further lens device ensures that a collimated light beam is present at least in this region, and accordingly that a possible intermediate image, and thus also an image in the eyepiece, is not modified as a result of the relative motion. The lens having positive refractive power performs the relative motion together with the tube housing. This could be achieved, for example, by the fact that the lens having positive refractive power is arranged in stationary fashion on the tube housing. The lens having negative refractive power, on the other hand, could be arranged e.g. on an assembly on which the beam deflecting unit, arranged in stationary fashion with respect to the microscope, is also mounted. Upon a relative motion of the tube housing, the spacing of the two lenses of the further lens device thus changes correspondingly.

In an embodiment, the lens device having positive refractive power arranged between the adaptation interface and the beam deflecting unit could be arranged movably. In this context, the relative motion of the tube housing with respect to the microscope would need to be constrainedly coupled to a motion of the lens device. For example, the lens device having positive refractive power could be moved quantitatively over the same distance as the tube housing is moved quantitatively relative to the microscope. The result of this action is that despite the relative motion of the tube housing with respect to the microscope, the length of the optical beam path in the tube remains unchanged from the movably arranged lens device onward. If a movably arranged lens device is provided, a further lens device, arranged in the region in which the light beam deflected by the beam deflecting unit extends in the predefined plane, is moreover unnecessary.

The constrained coupling between the motion of the lens device and the relative motion of the tube housing with respect to the microscope is provided, in a preferred embodiment, by way of coupling means. The coupling means could, for example, encompass complementary elements engaging positively into one another. At least one gear and at least one toothed rack could be provided as elements, the one element being arranged in stationary fashion relative to the microscope, and the other element being associated with the tube housing and/or the lens unit.

In an embodiment, two gears arranged at an offset from one another on a shaft, and arranged in stationary fashion on an assembly of the tube that does not also move in the context of a relative motion of the tube housing with respect to the microscope, are provided. A toothed rack engaging into the first gear could, for example, be mounted on the tube housing, so that upon a relative motion of the tube housing with respect to the microscope, the first gear is moved by the toothed rack. A second toothed rack could engage into the second gear and could be mounted on the movably arranged lens unit. By way of the shaft, the first gear that is rotated because of the relative motion of the tube housing moves the second gear, the further toothed rack, and thus the movably arranged lens unit over the same distance in very simple fashion.

In an embodiment, the motion of the lens unit is accomplished substantially in a direction perpendicular to the predefined plane. If the predefined plane is thus arranged horizontally, the motion of the lens unit occurs in the vertical direction. When the tube housing is then moved away from the microscope operator, i.e. toward the side of the microscope facing away from the operator, the lens unit is moved vertically upward as a result of the constrained coupling.

In an embodiment, the further beam guidance means encompass a Bauernfeind prism in which the light beam coming from the beam deflecting unit is preferably reflected twice. A Bauernfeind prism is an optical component that achieves two internal reflections in a very small volume. Two reflections in one component are advantageous because preferably only an even number of reflections (i.e. 0, 2, 4, . . . ) must be provided so that a microscope image that is familiar—i.e. laterally correct—can be presented to the microscope operator. This component thus does not introduce an odd number of reflections into the optical beam path. A compact design for the tube according to the present invention is thus hereby made possible.

In an embodiment, the light beam extending vertically from the microscope objective and from the adaptation interface could thus be deflected 90 degrees by the beam deflecting unit. This deflected light beam then passes through the Bauernfeind prism arranged after the beam deflecting unit, the light beam here being reflected twice in the Bauernfeind prism.

In a preferred embodiment, the further beam guidance means encompass a beam splitter device with which at least one part of the light beam coming from the adaptation interface can be split off to a documentation unit and/or to a detector. This beam splitter device could be embodied, for example, in the form of a beam-splitting plate. The beam splitter device preferably encompasses the Bauernfeind prism and a prism, the prism being cemented onto the Bauernfeind prism. A coating, which exhibits a definable splitting ratio between the light beam split off to the documentation interface and the light beam directed to the operator interface, is usually applied in the region of the joining point of the Bauernfeind prism and the prism. A splitting ratio of 1:1 could, for example, be implemented. In this example, the beam splitter device thus encompasses the Bauernfeind prism, the coating, and the prism. The documentation unit could, for example, be mounted on the tube housing and could thus likewise be moved upon a relative motion of the tube housing with respect to the microscope.

In some applications it is necessary to direct all of the light coming from the specimen to the microscope operator's eye. On the other hand, it can likewise be necessary to direct all of the light coming from the specimen to a documentation interface or to a CCD camera, in particular for applications with low specimen light intensity, e.g. fluorescence microscopy. For this instance, in an embodiment, provision is made for the beam splitter device to be conveyable out of its working position. If the beam splitter device is conveyed out of its working position, another deflecting element that directs the light beam either to the documentation interface or to the operator interface of the tube is introduced in its place. Provision is also made for introducing the beam splitter device back into its working position, specifically in order once again to split off one part of the light beam toward the documentation interface and direct the other part of the light beam toward the operator interface. Conveyance of the beam splitter could be accomplished in an embodiment by way of a magazine slider that is used, for example, in conventional microscope tubes.

It may be necessary not only for the tube according to the present invention to be movable in a direction parallel to the predefined plane, but also for the operator interface to be arranged rotatably, for example in order to modify, inter alia, the vertical position of the operator interface. In this case the operator interface could be arranged pivotably or rotatably about a rotation axis, the rotation axis being arranged perpendicular to the optical axis of a light beam extending in the tube. This relevant rotation axis is usually arranged perpendicular to the optical axis of the light beam that extends from a microscope objective of the microscope toward the tube. In addition, the rotation axis of the operator interface could be arranged perpendicular to the optical axis of the light beam that extends in the portion of the tube facing toward the operator.

For purposes of the present invention, the "operator interface" thus means the part of the tube that serves as a viewing port for the microscope user. The rotatably arranged operator interface advantageously makes it possible to work ergonomically with the microscope, since the rotation angle is adjustable in user-specific fashion, and the viewing height of the tube is thus adaptable to the particular user. Together with the relative motion of the tube parallel to the predefined plane, there are therefore sufficient degrees of freedom for individual user adjustment.

In order to implement the rotation of the operator interface, provision is made for the further guidance means to comprise a beam deflecting unit arranged rotatably about the rotation axis of the operator interface. The rotatably arranged beam deflecting unit is embodied in principle in the form of a mirror. A rotation of the operator interface is constrainedly coupled to a rotation of the rotatably arranged beam deflecting unit. The light beam coming from the adaptation interface ultimately extends in stationary fashion (except for the relative motion of the tube housing with respect to the microscope) as far as the rotatably arranged beam deflecting unit. From the rotatably arranged beam deflecting unit to the operator interface, the light beam co-rotates or co-pivots upon any rotation of the operator interface. The rotatably arranged beam deflecting unit must accordingly also co-rotate.

In an embodiment, provision is made that upon a rotation of the operator interface through a definable angle, a rotation of the rotatably arranged beam deflecting unit through half that angle occurs. In other words, for example, the rotatably arranged beam deflecting unit is rotated 22.5 degrees when the operator interface is rotated 45 degrees. This constrained coupling between operator interface and rotatably arranged beam deflecting unit could be achieved, for example, using a linkage or gear system that has an appropriate reduction ratio.

In a further embodiment, an assembly of the tube is configured in telescopable or pull-out fashion. A telescoping lens device that could be embodied in the form of an image-erecting tube lens could be provided, for example, for this purpose. The telescoping lens device comprises two lenses between which an infinite beam is present. The telescopable assembly could encompass one of the lenses and the operator interface. The other lens could be arranged in stationary fashion on the tube housing. The spacing between the two lenses of the telescoping lens device is varied by pulling out or pushing in the assembly. The assembly is preferably telescopable in the direction of the optical axis of the light beam extending in the assembly. Additional elements deflecting the light beam are thus, advantageously, not necessary. As a result of the movable tube housing and the telescopable assembly in combination with the rotatably arranged operator interface, the tube according to the present invention is, in advantageous fashion, individually adjustable to the needs of an operator.

BRIEF DESCRIPTION OF THE DRAWINGS

There are various ways of advantageously embodying and developing the teaching of the present invention. The reader is referred, for that purpose, on the one hand to the claims subordinate to claim 1, and on the other hand to the explanation below of the preferred exemplary embodiments of the invention with reference to the drawings. In conjunction with the explanation of the preferred exemplary embodiments of the invention with reference to the drawings, an explanation is also given of generally preferred embodiments and developments of the teaching.

DETAILED DESCRIPTION

FIGS. 1 through 3 and 5 show a tube 1 for an upright microscope 2. Tube 1 encompasses a tube housing 3 as well as an adaptation interface 4 with which tube housing 3 is adaptable on microscope 2. Provided in tube 1 is a beam deflecting unit 5 which deflects a light beam, coming from adaptation interface 4, in such a way that its optical axis 6 extends at least locally in a predefined plane. The predefined plane is arranged horizontally and perpendicular to the drawing plane. Further beam guidance means 7, which guide the light beam deflected by beam deflecting unit 5 to operator interface 8, are provided in tube 1.

Figure 2:
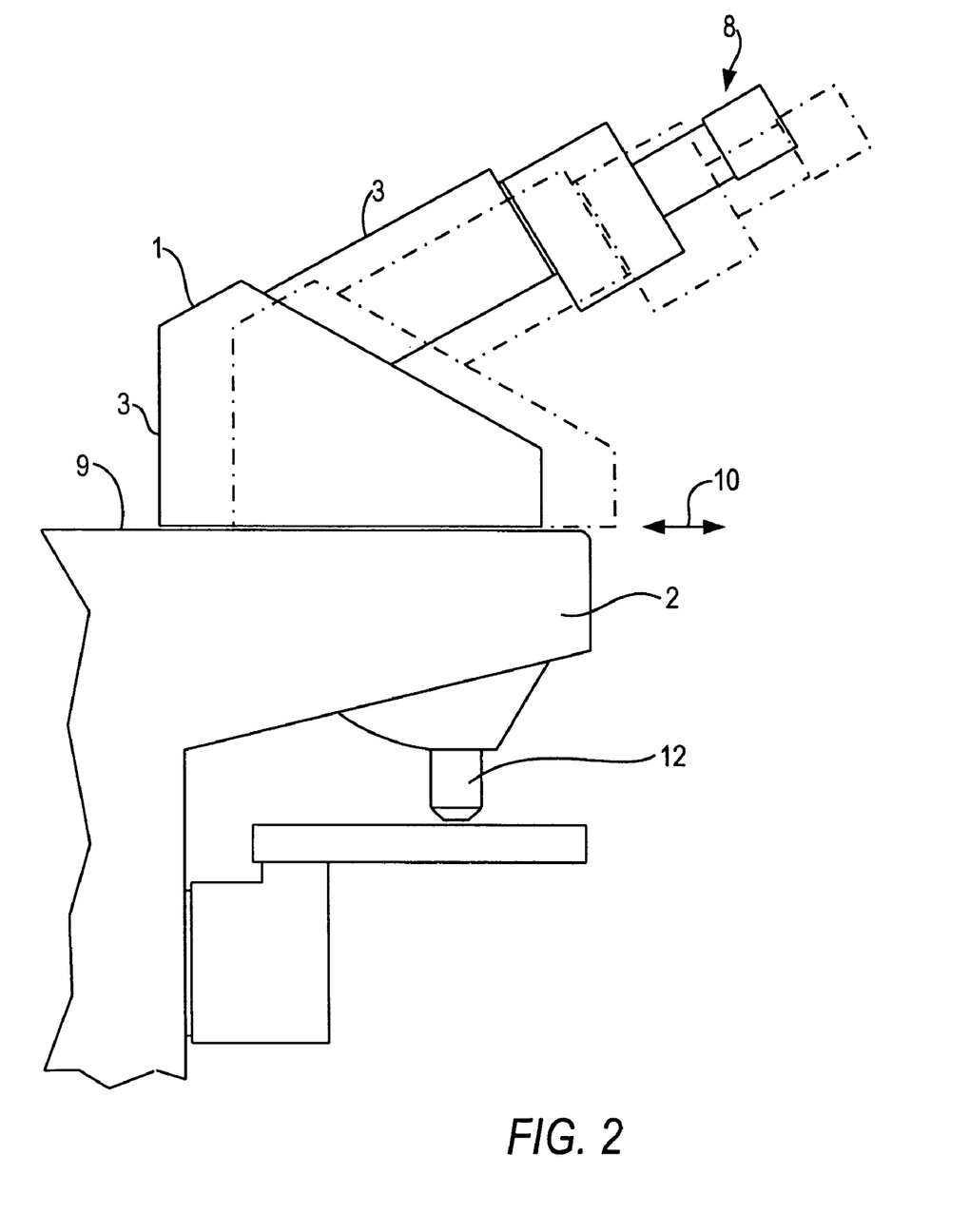
FIG. 2 is a schematic side view of the tube of FIG. 1 for a microscope.

FIG. 2 shows that according to the present invention, a relative motion of tube housing 3 with respect to microscope 2 is provided for, the relative motion being accomplished in a direction parallel to the predefined plane. Further beam guidance means 7 and operator interface 8 are also encompassed in the relative motion of tube housing 3.

The predefined plane is arranged horizontally, parallel to upper housing surface 9. The relative motion of tube housing 3 with respect to microscope 2 is accordingly accomplished along the direction of double arrow 10 shown in FIG. 2, i.e. either away from or toward the operator.

Figure 1:
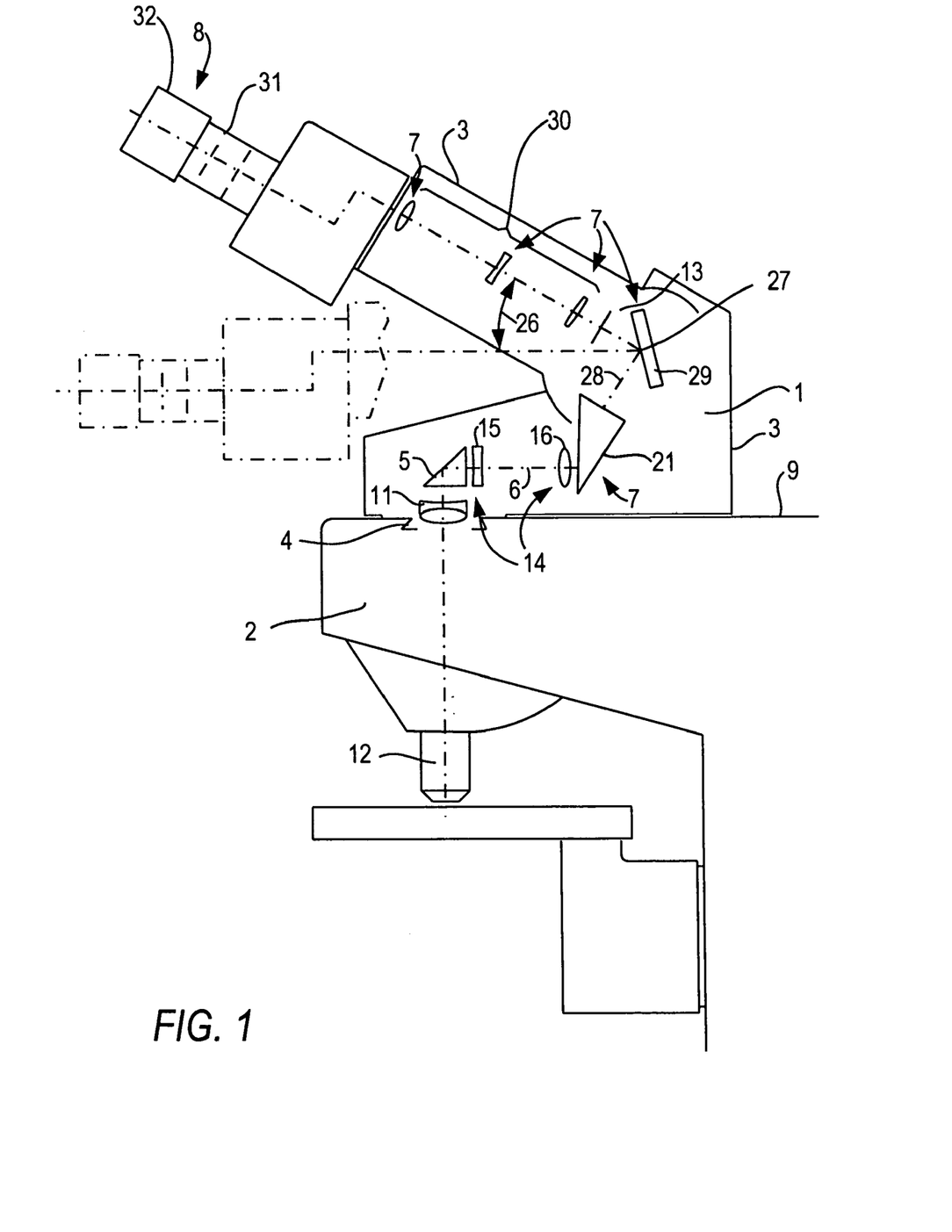
FIG. 1 is a schematic laterally sectioned depiction of a first exemplary embodiment of a tube according to the present invention for a microscope.
Figure 3:
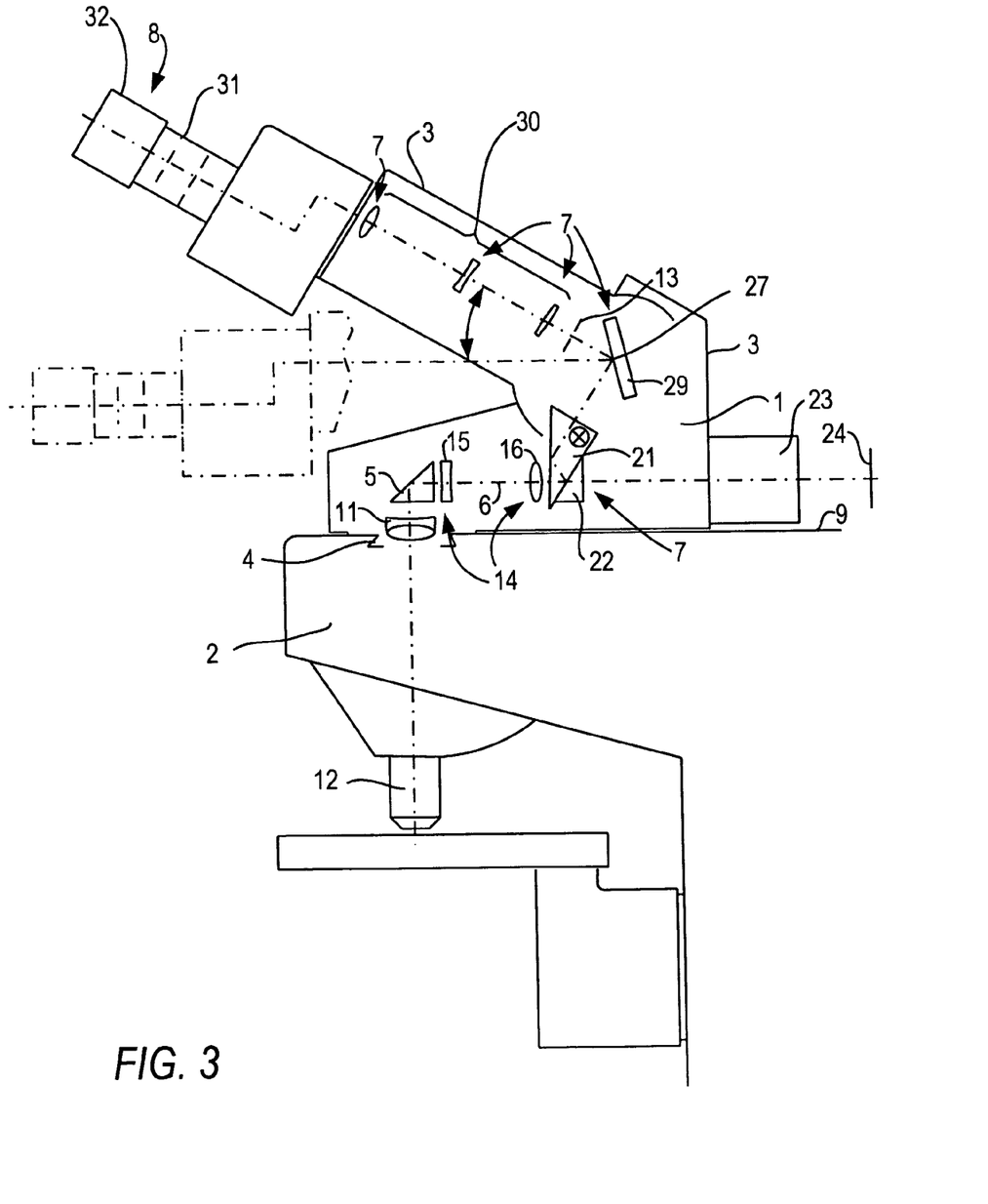
FIG. 3 is a schematic laterally sectioned depiction of a second exemplary embodiment of a tube according to the present invention a microscope.

It is evident from FIGS. 1 and 3 that a lens device 11 is provided between adaptation interface 4 and beam deflecting unit 5. Lens device 11 has a positive refractive power and converts a substantially collimated light beam, coming from microscope 2 or from microscope objective 12, into a converging light beam. An intermediate image 13 is produced by lens device 11.

FIGS. 1 and 3 show that a further lens device 14 is provided in the region in which the light beam deflected by beam deflecting unit 5 extends in the predefined plane. Further lens device 14 encompasses a lens 15 having negative refractive power and a lens 16 having positive refractive power. The two lenses 15, 16 are configured and arranged in such a way that a substantially collimated light beam extends between lenses 15, 16. Upon a relative motion of tube housing 3 with respect to microscope 2, lens 16 having positive refractive power also executes the relative motion. The spacing of the two lenses 15, 16 thus changes correspondingly in the context of a relative motion. Upon a relative motion of tube housing 3 of the exemplary embodiments shown in FIGS. 1 and 3, all the further components—except adaptation interface 4, beam deflecting unit 5, and lens 15—are likewise moved. But because a substantially collimated light beam extends (i.e. a so-called infinite beam is present) between the two lenses 15, 16, there is no change in intermediate image 13 produced by lens device 11 and thus also none in the image produced in operator interface 8; only the pupil location is modified by the relative motion.

Figure 5:
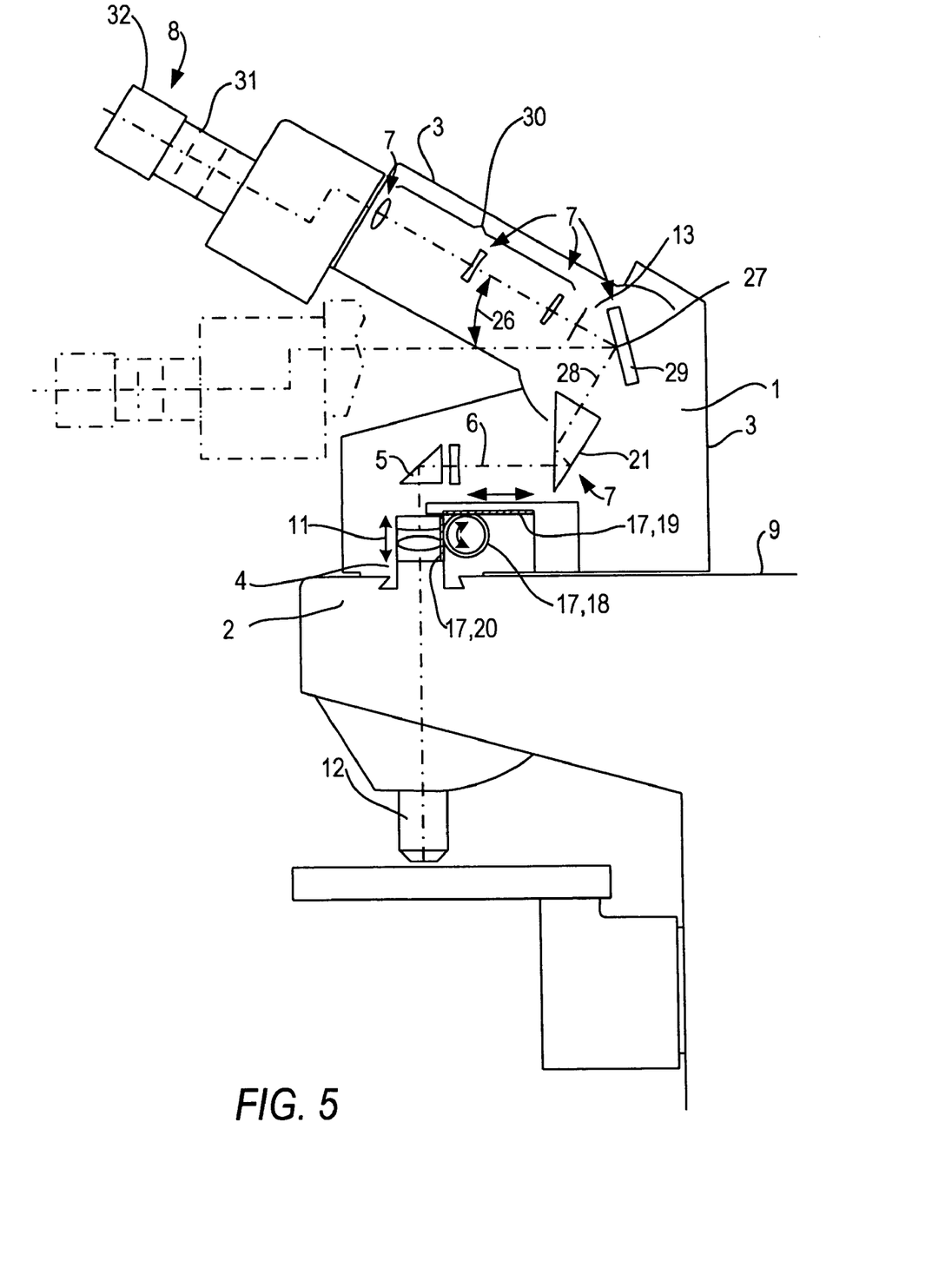
FIG. 5 is a schematic laterally sectioned depiction of a further exemplary embodiment of the present invention.

In the exemplary embodiment shown in FIG. 5, lens device 11 having positive refractive power is arranged movably. The motion of lens device 11 is constrainedly coupled to the relative motion of tube housing 3 with respect to microscope 2. Because of the constrained coupling, lens device 11 having positive refractive power is moved quantitatively over the same distance as tube housing 3 is moved quantitatively relative to microscope 2. As a result, intermediate image 13 produced by the movably arranged lens device 11 is always located at the same point.

Coupling means 17 are provided for constrained coupling of lens device 11 to the relative motion of tube housing 3 with respect to microscope 2, coupling means 17 comprising on the one hand two gears 18, and on the other hand respective toothed racks 19, 20. Gears 18 are arranged on a shaft in stationary fashion relative to adaptation interface 4 and to microscope 2, respectively. Toothed rack 19, indicated only schematically, is arranged in stationary fashion with respect to tube housing 3. Toothed rack 20, likewise only schematically indicated, is arranged in stationary fashion on the movably arranged lens device 11, but not in the same drawing plane. When tube housing 3 is then moved away by the operator, first gear 18 is rotated around to the right (in the view shown in FIG. 5) because of the engagement of toothed rack 19 into first gear 18. Because the rotational motion of first gear 18 is transferred via the shaft to the second gear and the latter is engaged into toothed rack 20, this in turn causes an upward motion of lens device 11. The relative motion of tube housing 3 with respect to microscope 2 that can be performed in FIG. 5 is accomplished parallel to the horizontal plane; the motion of lens unit 11 is accomplished substantially perpendicular to that plane, i.e. vertically.

Figure 4:
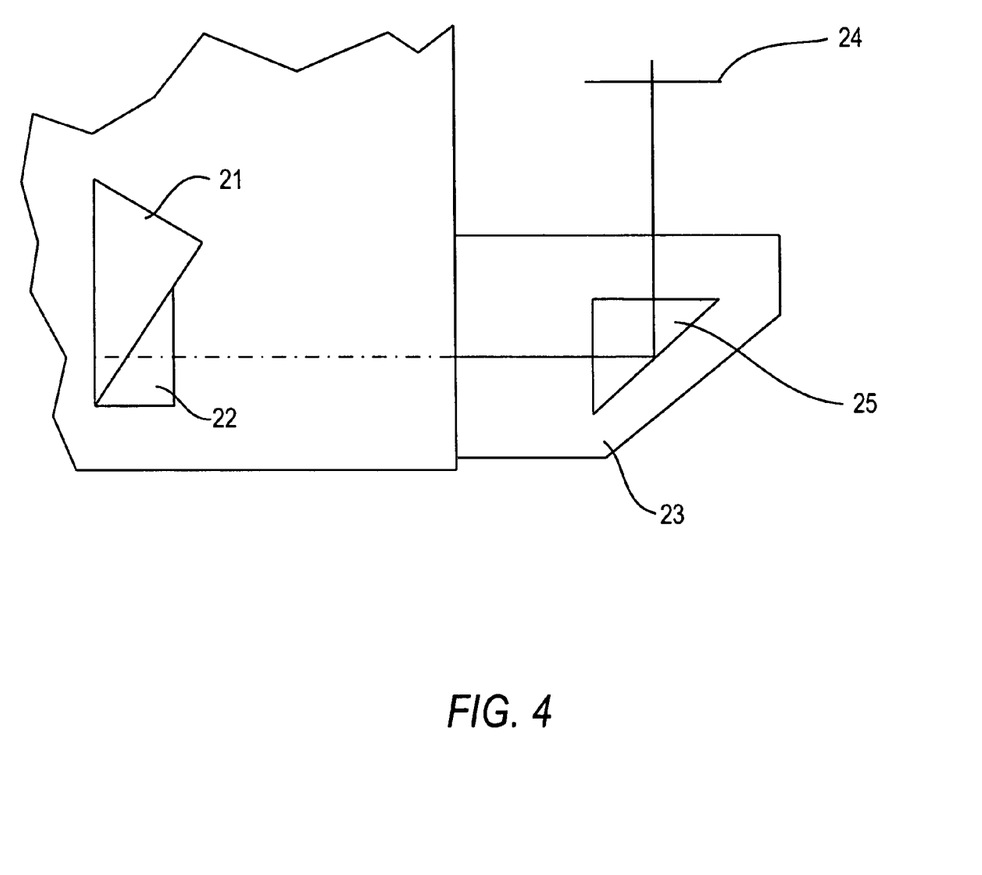
FIG. 4 is a schematic laterally sectioned depiction of a portion of a further exemplary embodiment of the present invention.

Further beam guidance means 7 encompass a Bauernfeind prism 21 in which the light beam coming from beam deflecting unit 5 is internally reflected twice, as schematically indicated in FIGS. 1, 3, and 5. It is evident from FIG. 3 that further beam guidance means 7 encompass a beam splitter device that comprises Bauernfeind prism 21 and a prism 22. A coating (not shown) of Bauernfeind prism 21 having a splitting ratio of 1:1 is provided between Bauernfeind prism 21 and prism 22. With the beam splitter device, one part of the light beam coming from adaptation interface 4 can be split off to a documentation unit (not shown in FIG. 3). Lens device 11 generates an intermediate image 24 for documentation port 23 as well. In the exemplary embodiment of FIG. 4, intermediate image 24 is arranged horizontally, since the light beam entering documentation port 23 is deflected 90 degrees by deflecting prism 25.

The tubes shown in FIGS. 1, 3, and 5 are each shown in two different rotational positions. In the one position (drawn with dashed lines), most of the optical axis of the light beam extending in operator interface 8 is arranged horizontally, and is therefore located at an angular position of 0 degrees. Operator interface 8 rotated through 30 degrees, as indicated by angle 26, is shown with solid lines. The operator interface is arranged rotatably about rotation axis 27. Rotation axis 27 runs perpendicular to the drawing plane and perpendicular to optical axis 28 of the light beam coming from Bauernfeind prism 21. Further guidance means 7 encompass a beam deflecting unit 29 arranged rotatably about rotation axis 27. A rotation of operator interface 8 is constrainedly coupled to a rotation of the rotatably arranged beam deflecting unit 29, thereby ensuring that the light beam coming from microscope objective 12 is always directed to operator interface 8 even in the context of a rotational motion of operator interface 8. The constrained coupling between the rotational motion of operator interface 8 and the rotatably arranged beam deflecting unit 29 is accomplished here in such a way that upon a rotation of the operator interface through angle 26, the rotatably arranged beam deflecting unit is rotated through half that angle.

An even number of reflections is provided for in tube 1, thereby ensuring that a laterally correct image is produced. In particular, Bauernfeind prism 21 is arranged in such a way that in no position of the rotatably arranged beam deflecting unit 29 does the angle between the incident and emerging beam become greater than 110 degrees.

Tube lens 30, which encompasses three individual lens elements, images intermediate image 13 into eyepiece intermediate image 31, the image-erecting tube lens 30 being mounted in a tubular element (not depicted). Eyepiece intermediate image 31 can be viewed using eyepieces 32.

The beam splitter device shown in FIG. 3, comprising Bauernfeind prism 21 and prism 22, is arranged displaceably in a direction perpendicular to the drawing plane and can be click-stopped in different positions. In a first position, the beam splitter device comprising Bauernfeind prism 21 and prism 22 is inserted in the beam path. This position is shown in FIG. 3. In a second position, all the light is deflected to operator interface 8, i.e. in this position only a Bauernfeind prism 21 is provided; this is correspondingly shown in terms of this detail, for example, in FIGS. 1 and 5. In the third position, shown in terms of this detail in FIG. 4, Bauernfeind prism 21 and a prism 22 are inserted in the beam path, the common surface of Bauernfeind prism 21 and prism 22 being embodied in such a way that the entire light beam passes through the two components without reflection, and is directed to documentation port 23.

In conclusion, be it noted that the exemplary embodiments discussed above serve merely to describe the teaching claimed, but do not limit it to the exemplary embodiments.

PARTS LIST

1 Tube
2 Microscope
3 Tube housing
4 Adaptation interface
5 Beam deflecting unit
6 Optical axis of light beam deflected by (5)
7 Further beam guidance means
8 User interface
9 Upper housing surface of (2)
10 Direction of relative motion between (3) and (2)
11 Lens device
12 Microscope objective
13 Intermediate image
14 Further lens device
15 Lens of (14) having negative refractive power
16 Lens of (14) having positive refractive power
17 Coupling means
18 Two gears arranged on a common shaft
19 Toothed rack
20 Toothed rack
21 Bauernfeind prism
22 Prism
23 Documentation port
24 Intermediate image
25 Deflecting prism
26 Angle
27 Rotation axis
28 Optical axis of light beam coming from (21)
29 Rotatably arranged beam deflecting unit
30 Tube lens
31 Eyepiece intermediate image
32 Eyepiece

What is claimed is:

1. A tube for a microscope, comprising:
   a tube housing;
   an adaptation interface;
   a beam guidance device;
   an operator interface; and
   a beam deflecting device configured to deflect a light beam coming from the adaptation interface to a first optical axis, the first optical axis at least locally extending substantially in a predefined plane so as to be guidable by the beam guidance device to the operator interface;
   wherein the beam guidance device includes a beam deflection unit, the beam deflection unit being configured to receive the light beam along a second optical axis and deflect the light beam to the operator interface along a third optical axis, the beam deflection unit being rotatable about an axis perpendicular to the second optical axis so as to vary a direction of the third optical axis; and
   wherein the tube housing, together with the beam guidance device and the operator interface, is movable relative to the microscope in a direction parallel to the first optical axis.

2. The tube as recited in claim 1 wherein the predefined plane is at least one of substantially parallel to a changing surface of the tube, parallel to an upper housing surface of the microscope, and substantially horizontal.

3. The tube as recited in claim 1 wherein a relative motion of at least one part of the tube housing with respect to the microscope is guidable using a guidance device.

4. The tube as recited in claim 3 wherein the guidance device includes a positively engaging device.

5. The tube as recited in claim 1 wherein the tube housing is movable relative to the microscope in a direction away from or toward the operator.

6. The tube as recited in claim 1 further comprising a lens device disposed between the adaptation interface and the beam deflecting device.

7. The tube as recited in claim 6 wherein the lens device has a positive refractive power and is configured to convert a substantially collimated light beam coming from the microscope into a converging light beam.

8. The tube as recited in claim 6 further comprising a further lens device disposed in a region in which the light beam deflected by the beam deflecting device extends in the predefined plane.

9. The tube as recited in claim 8 wherein the further lens device includes a first lens having a negative refractive power and a second lens having a positive refractive power, the first and second lenses being configured to form a substantially collimated light beam extending between the first and second lenses.

10. The tube as recited in claim 9 wherein the second lens is movable with the tube housing relative to the microscope.

11. The tube as recited in claim 6 wherein the lens device has a positive refractive power and is movably disposed so as to be constrainedly coupled to a motion of the tube housing relative to the microscope.

12. The tube as recited in claim 11 wherein the lens device is configured to move over a same quantitative distance as the tube housing is moved relative to the microscope.

13. The tube as recited in claim 11 further comprising a coupling device configured to constrainedly couple the lens device to the motion of the tube housing relative to the microscope.

14. The tube as recited in claim 13 wherein the coupling device includes a first and a second complementary element configured to engage positively with one another.

15. The tube as recited in claim 14 wherein the first complementary element includes at least one gear and the second complementary element includes at least one toothed rack, the first complementary element being disposed in stationary fashion relative to the microscope, and the second complementary element being associated with at least one of the tube housing and the lens device.

16. The tube as recited in claim 15 wherein the lens device is configured to move in a direction substantially perpendicular to the predefined plane.

17. The tube as recited in claim 14 wherein the first complementary element includes at least one gear and the second complementary element includes at least one toothed rack, the second complementary element being disposed in stationary fashion relative to the microscope, and the first complementary element being associated with at least one of the tube housing and the lens device.

18. The tube as recited in claim 17 wherein the lens device is configured to move in a direction substantially perpendicular to the predefined plane.

19. The tube as recited in claim 1 wherein the beam guidance device includes a Bauernfeind prism.

20. The tube as recited in claim 19 wherein the Bauernfeind prism is configured to twice reflect a light beam coming from the beam deflecting unit.

21. The tube as recited in claim 19 wherein the beam guidance device includes a beam splitter device configured to split off, to at least one of a documentation unit and a detector, at least a part of the light beam coming from the adaptation interface.

22. The tube as recited in claim 21 wherein the beam splitter device is movable into and out of a working position.

23. The tube as recited in claim 22 wherein the beam splitter device is movable into and out of the working position guided by a magazine slider.

24. The tube as recited in claim 1 wherein the operator interface is rotatable about a rotation axis, the rotation axis being perpendicular to an optical axis of the light beam.

25. The tube as recited in claim 24 wherein the beam guidance device includes a second beam deflecting device configured to rotate about the rotation axis, and a rotation of the operator interface being constrainedly coupled to a rotation of the second beam deflecting device.

26. The tube as recited in claim 25 wherein, upon a rotation of the operator interface through a first angle, the second beam deflecting device is configured to rotate through a second angle half as large as the first angle.

27. The tube as recited in claim 1 further comprising a telescopable assembly telescopable in a direction of an optical axis of a light beam extending therein.

* * * * *